(12) United States Patent
Hisaki et al.

(10) Patent No.: US 11,069,178 B2
(45) Date of Patent: Jul. 20, 2021

(54) DISPLAY DEVICE AND GAME MACHINE

(71) Applicant: Omron Corporation, Kyoto (JP)

(72) Inventors: Shohei Hisaki, Ichinomiya (JP); Junya Fujita, Ichinomiya (JP); Jun Kishimoto, Ogaki (JP); Shogo Ikeda, Ichinomiya (JP); Masanori Mori, Ichinomiya (JP); Yoshihiko Takagi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/614,718

(22) PCT Filed: Jul. 24, 2018

(86) PCT No.: PCT/JP2018/027758
§ 371 (c)(1),
(2) Date: Nov. 18, 2019

(87) PCT Pub. No.: WO2019/031237
PCT Pub. Date: Feb. 14, 2019

(65) Prior Publication Data
US 2020/0184762 A1    Jun. 11, 2020

(30) Foreign Application Priority Data
Aug. 10, 2017    (JP) .............................. JP2017-155611

(51) Int. Cl.
*G07F 17/32* (2006.01)
*F21V 8/00* (2006.01)
(Continued)

(52) U.S. Cl.
CPC ............ *G07F 17/3211* (2013.01); *G02B 6/00* (2013.01); *G02B 6/006* (2013.01); *G02B 6/0036* (2013.01);
(Continued)

(58) Field of Classification Search
CPC ............ G07F 17/3211; G07F 17/3213; G02B 6/0036; G02B 6/006; G02B 6/0068; G09F 2013/184; G09F 2013/185
See application file for complete search history.

(56) References Cited

U.S. PATENT DOCUMENTS

2001/0049893 A1    12/2001    Maas et al.
2003/0046842 A1    3/2003    Maas et al.
(Continued)

FOREIGN PATENT DOCUMENTS

CN    1350683 A    5/2002
CN    201111585 Y    9/2008
(Continued)

OTHER PUBLICATIONS

International Search Report issued in PCT/JP2018/027758 dated Oct. 2, 2018 (2 pages).
(Continued)

*Primary Examiner* — Bryon T Gyllstrom
*Assistant Examiner* — James M Endo
(74) *Attorney, Agent, or Firm* — Osha Bergman Watanabe & Burton LLP (57) ABSTRACT

A display device includes a light guide plate 2 capable of displaying a plurality of patterns (21-1 to 21-9) and including an incident surface; a plurality of light sources (3-1 to 3-9) disposed opposite to the incident surface and corresponding to the plurality of patterns; a storage 5 configured to store a reference table that represents a relationship between a turn-on state number and a combination of light sources to be turned on among the plurality of light sources for each of a plurality of the turn-on state numbers; and a controller 7 configured to specify the combination of light sources to be turned on by referring to the reference table, the combination corresponding to the turn-on state number (Continued)

included in turn-on control information, and control turn-on and turn-off of each light source according to the combination of the light sources. The light guide plate 2 includes a plurality of prisms arrayed on one of surfaces of the light guide plate along the plurality of patterns, the plurality of prisms reflecting light toward the other surface of the light guide plate, the light being emitted from a light source corresponding to the pattern and being incident on the light guide plate from the incident surface.

1 Claim, 9 Drawing Sheets (51) Int. Cl.
    *G07F 17/34*     (2006.01)
    *G02B 6/00*     (2006.01)

(52) U.S. Cl.
    CPC ....... *G02B 6/0068* (2013.01); *G07F 17/3213* (2013.01); *G07F 17/34* (2013.01)

(56) References Cited

U.S. PATENT DOCUMENTS

| | | | | |
|---|---|---|---|---|
| 2007/0171674 A1* | 7/2007 | Deutsch | ............... | G02B 6/0076 362/612 |
| 2007/0236959 A1* | 10/2007 | Tolbert | ................... | G02B 6/006 362/616 |
| 2008/0110067 A1* | 5/2008 | Smith | ..................... | G09F 13/00 40/541 |
| 2008/0291695 A1* | 11/2008 | Okayasu | ................. | G09F 13/08 362/619 |
| 2009/0073721 A1* | 3/2009 | Kamikatano | ........ | G02B 6/0076 362/616 |
| 2009/0168457 A1* | 7/2009 | Lai | ........................... | F21S 8/00 362/618 |
| 2009/0168458 A1* | 7/2009 | Lai | ........................... | G09F 13/18 362/619 |
| 2009/0219734 A1* | 9/2009 | Sawada | ................... | G09F 13/18 362/616 |
| 2010/0142183 A1* | 6/2010 | Lerenius | .............. | G02B 6/0036 362/85 |
| 2010/0254158 A1* | 10/2010 | Harton | ................... | G02B 6/006 362/607 |
| 2010/0259485 A1* | 10/2010 | Chuang | ................. | G06F 3/0445 345/173 |
| 2011/0194167 A1* | 8/2011 | Jackson | ................. | G02B 27/01 359/290 |
| 2013/0310143 A1 | 11/2013 | Kondo et al. | | |
| 2013/0343084 A1* | 12/2013 | Okuda | .................... | C22C 38/06 362/609 |
| 2016/0216434 A1* | 7/2016 | Shih | ....................... | G02B 6/006 |
| 2017/0146721 A1* | 5/2017 | Fukui | .................. | G02B 6/0031 |
| 2018/0182201 A1 | 6/2018 | Fujita et al. | | |

FOREIGN PATENT DOCUMENTS

| | | |
|---|---|---|
| CN | 101909379 A | 12/2010 |
| CN | 103418139 A | 12/2013 |
| CN | 104754831 A | 7/2015 |
| CN | 205344676 U | 6/2016 |
| CN | 106530977 A | 3/2017 |
| JP | S48-10920 B1 | 4/1973 |
| JP | 2001-029546 A | 2/2001 |
| JP | 2003-519810 A | 6/2003 |
| JP | 2009-125529 A | 6/2009 |
| JP | 2017-107048 A | 6/2017 |

OTHER PUBLICATIONS

Written Opinion of the International Searching Authority issued in in PCT/JP2018/027758 dated Oct. 2, 2018 (6 pages).
Office Action issued in the counterpart Chinese Patent Application No. 201880030711.X, dated Dec. 30, 2020 (18 pages).

\* cited by examiner

| Turn-on state number | L1 | L2 | L3 | L4 | L5 | L6 | L7 | L8 | L9 |
|---|---|---|---|---|---|---|---|---|---|
| 1 | On | Off | Off | Off | Off | Off | Off | Off | Off |
| 2 | Off | On | Off | Off | Off | Off | Off | Off | Off |
| 3 | Off | Off | On | Off | Off | Off | Off | Off | Off |
| ... | ... | ... | ... | ... | ... | ... | ... | ... | ... |
| j | Off | On | Off | Off | On | Off | Off | On | Off |
| ... | ... | ... | ... | ... | ... | ... | ... | ... | ... |
| n−1 | On | On | Off | On | On | On | On | On | On |
| n | Off | Off | Off | Off | Off | Off | Off | Off | Off |

DISPLAY DEVICE AND GAME MACHINE

TECHNICAL FIELD

The present invention relates to a display device capable of switching a displayed pattern and a game machine having the display device.

BACKGROUND ART

Conventionally, there has been proposed a technique of allowing a displayed pattern to be dynamically switched according to a light source to be turned on among a plurality of light sources (for example, see Patent Document 1).

For example, the display device disclosed in Patent Document 1 includes a light guide plate capable of displaying a plurality of patterns, a plurality of light sources arranged along one side of the light guide plate, and a controller that controls turn-on and turn-off of the plurality of light sources according to turn-on order information. The light guide plate includes a plurality of prisms arrayed on one of surfaces of the light guide plate along the pattern for each pattern, the plurality of prisms reflecting visible light toward the other surface of the light guide plate, the visible light being emitted from the light source corresponding to the pattern among the plurality of light sources and being incident on the light guide plate from an incident surface of the light guide plate.

PRIOR ART DOCUMENTS

Patent Document

Patent Document 1: Japanese Unexamined Patent Publication No. 2017-107048

SUMMARY OF THE INVENTION

Problems to be Solved by the Invention

The display device disclosed in Patent Document 1 can sequentially switch display patterns by controlling the turn-on and the turn-off of the plurality of light sources according to the turn-on order information. However, in the display device, because a high-order control device generates the turn-on order information and notifies the display device, the high-order control device generates the turn-on order information according to the turn-on order of the individual light source when the turn-on order of each light source is changed, and a load on the high-order control device increases. For this reason, there is a demand for a display device that can simplify the control for switching the display pattern.

An object of the present invention is to provide a display device that can simplify the control for switching the display pattern.

Means for Solving the Problem

According to one aspect of the present invention, a display device is provided. The display device includes: a light guide plate made of a transparent material, capable of displaying a plurality of patterns, and including an incident surface; a plurality of light sources disposed opposite to the incident surface and corresponding to the plurality of patterns; a storage configured to store a reference table that represents a relationship between a turn-on state number and a combination of light sources to be turned on among the plurality of light sources for each of a plurality of the turn-on state numbers; a communication unit configured to receive turn-on control information including one of the plurality of turn-on state numbers; and a controller configured to specify the combination of light sources to be turned on among the plurality of light sources by referring to the reference table, the combination corresponding to the turn-on state number included in the turn-on control information, and control turn-on and turn-off of the plurality of light sources according to the combination of the light sources. The light guide plate includes a plurality of prisms arrayed on one of surfaces of the light guide plate along the plurality of patterns, the plurality of prisms reflecting light toward the other surface of the light guide plate, the light being emitted from a light source corresponding to the pattern among the plurality of light sources and being incident on the light guide plate from the incident surface.

In the display device, preferably the reference table represents a relationship among the turn-on state number, a combination of at least two light sources to be turned on, and order applied in the combination of the at least two light sources to be turn on for at least one of the plurality of turn-on state numbers, and the controller refers to the reference table, specifies the combination of the at least two light sources to be turned on corresponding to the at least one turn-on state number included in the turn-on control information, and the order applied, and controls the turn-on and the turn-off of the plurality of light sources according to the combination of the at least two light sources to be turned on and the order applied.

According to another aspect of the present invention, a game machine is provided. The game machine includes: a game machine main body; a display device provided on a surface of the game machine main body on a side opposed to a player; and a control circuit configured to generate turn-on control information including one of a plurality of turn-on state numbers according to a state of a game, and transmit the turn-on control information to the display device; The display device includes: a light guide plate made of a transparent material, capable of displaying a plurality of patterns, and including an incident surface; a plurality of light sources disposed opposite to the incident surface and corresponding to the plurality of patterns; a storage configured to store a reference table that represents a relationship between a turn-on state number and a combination of light sources to be turned on among the plurality of light sources for each of a plurality of the turn-on state numbers; a communication unit configured to receive turn-on control information; and a controller configured to specify the combination of light sources to be turned on among the plurality of light sources by referring to the reference table, the combination corresponding to the turn-on state number included in the turn-on control information, and control turn-on and turn-off of the plurality of light sources according to the combination of the light sources. The light guide plate includes a plurality of prisms arrayed on one of surfaces of the light guide plate along the plurality of patterns, the plurality of prisms reflecting light toward the other surface of the light guide plate, the light being emitted from a light source corresponding to the pattern among the plurality of light sources and being incident on the light guide plate from the incident surface.

Effect of the Invention

The display device according to the present invention has an effect that can simplify the control for switching the display pattern.

MODE FOR CARRYING OUT THE INVENTION

Hereinafter, a display device according to an embodiment of the present invention will be described with reference to the drawings. The display device includes a light guide plate in which a material transparent to light emitted from a plurality of light sources is formed into a plate shape, and a plurality of patterns are provided on the light guide plate. In the display device, one of surfaces of the light guide plate is formed as an outgoing surface facing a player, and a peripheral side surface surrounding the outgoing surface of the light guide plate is formed as an incident surface opposed to the plurality of light sources that correspond to the plurality of patterns in a one-to-one manner. A plurality of prisms each of which reflects, to the outgoing surface, the light, which emitted from the corresponding one of the plurality of light sources and is incident on the light guide plate for each of the plurality of patterns, are arrayed along the plurality of patterns on the other surface of the light guide plate opposed to the outgoing surface. Thus, the display device can dynamically switch the display pattern by switching the light source to be turned on.

The display device previously stores a combination of the light sources to be turned on among the plurality of light sources and a turn-on state number corresponding to the combination in a one-to-one manner while associating the combination and the turn-on state number with each other. When receiving turn-on control information including the turn-on state number from a higher-order control device such as a control circuit of a game machine in which the display device is incorporated, the display device specifies the combination of the light sources to be turned on corresponding to the turn-on state number, and lights each light source designated by the specified combination, thereby displaying the pattern corresponding to each light source to be turned on.

Hereinafter, for convenience, a side opposed to the player is referred to as a front surface, and an opposite side to the front surface is referred to as a back surface.

Figure 1:
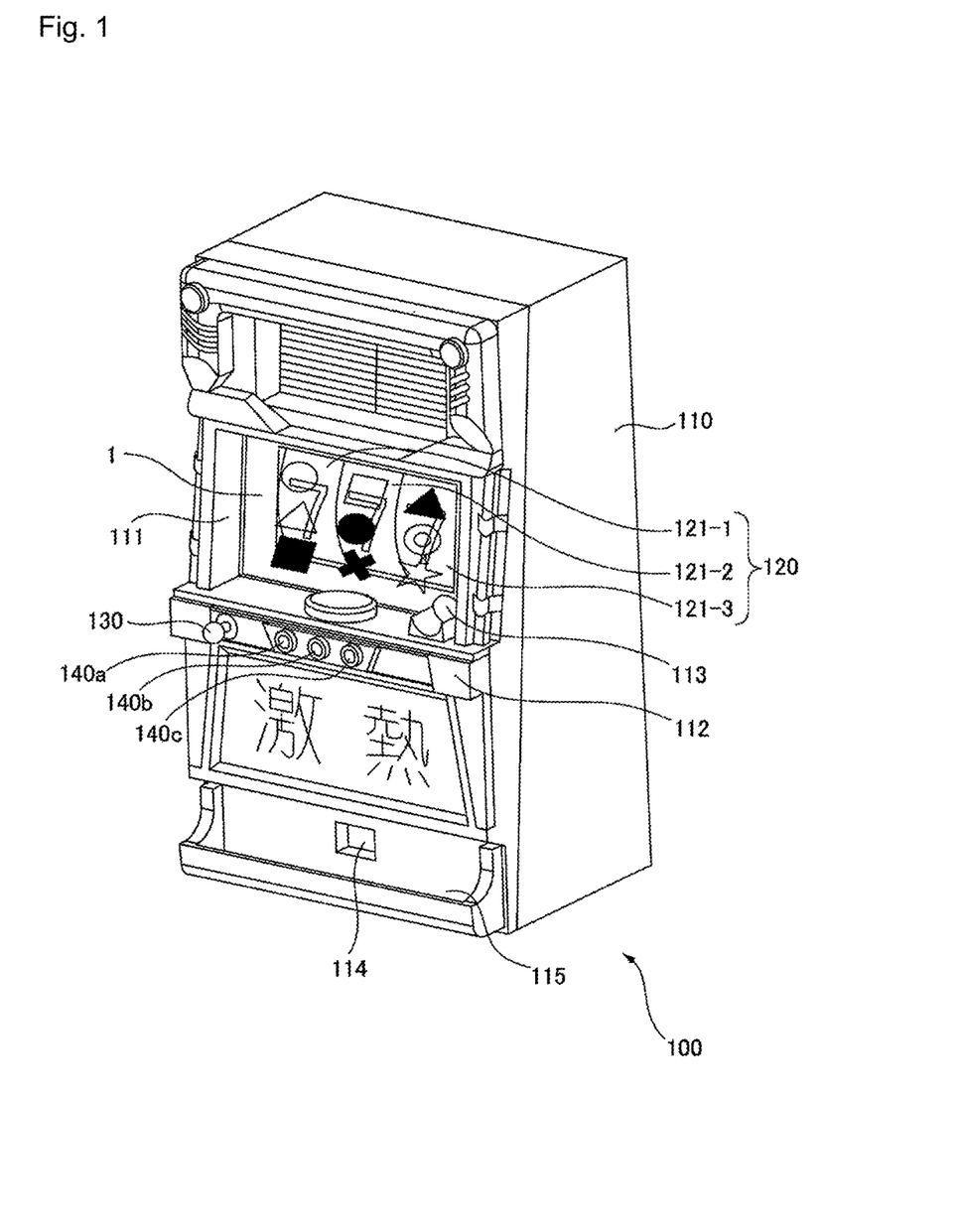
FIG. 1 is a schematic configuration diagram illustrating a reel game machine including a display device according to an embodiment of the present invention.
Figure 2:
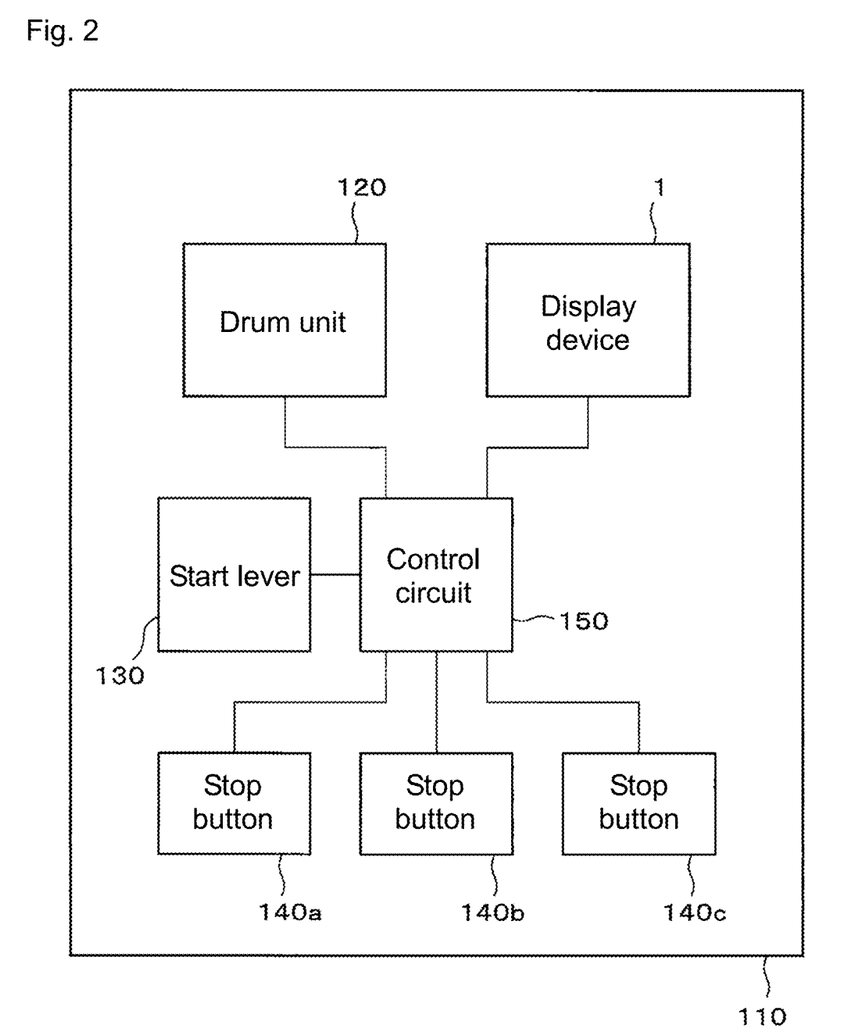
FIG. 2 is a schematic internal configuration diagram of the reel game machine.

FIG. 1 is a schematic configuration diagram illustrating a reel game machine 100 including a display device according to an embodiment of the present invention. FIG. 2 is a schematic internal configuration diagram of the reel game machine 100. As illustrated in FIG. 1, the reel game machine 100 includes a main body casing 110 that is a game machine main body, a drum unit 120, a start lever 130, stop buttons 140a to 140c, and a display device 1.

The reel game machine 100 includes a control circuit 150 that controls each unit of the reel game machine 100, a power supply circuit (not illustrated) that supplies power to each unit of the reel game machine 100, and a token storage and discharge mechanism (not illustrated) that temporarily stores a token and discharges the token according to a control signal from the control circuit 150 in the main body casing 110.

An opening 111 is formed in an upper center of a front surface of the main body casing 110, and a part of the drum unit 120 can be visually recognized through the opening 111. A token slot 113 into which a token is inserted is formed on a top surface of a frame 112 below the opening 111.

The drum unit 120 includes three drums 121-1 to 121-3. Each of the drums 121-1 to 121-3 can rotate separately about a rotation axis (not illustrated) that is substantially parallel and substantially horizontal to the front surface of the main body casing 110 according to the control signal from the control circuit 150. The surface of each of the drums 121-1 to 121-3 is divided into a plurality of regions having substantially the same width along a rotation direction, various patterns are drawn for each region, and a part of the region can visually recognized by the player through the opening 111.

The start lever 130 is provided on a left side with respect to the front surface of the frame 112 of the main body casing 110. The stop buttons 140a to 140c are provided in a substantial center of the front surface of the frame 112. The stop buttons 140a to 140c correspond to the drums 121-1 to 121-3, respectively.

A token outlet 114 through which the token is discharged is formed in a lower portion of the front surface of the main body casing 110. A token tray 115 that prevents a fall of the discharged token is attached below the token outlet 114.

When the start lever 130 is operated after the token is inserted into the token slot 113, a signal indicating the operation of the start lever 130 is transmitted to the control circuit 150. The control circuit 150 starts the rotation of the drums 121-1 to 121-3.

Subsequently, when any one of the stop buttons 140a to 140c is pressed down, the control circuit 150 receives a signal indicating the pressing down of the button, and stops the rotation of the drum corresponding to the pressed-down button. Alternatively, the control circuit 150 stops the drum, in which the corresponding stop button is not pressed down until a predetermined cycle elapses since the start of the rotation, among the drums 121-1 to 121-3, after the predetermined cycle elapses.

When the same pattern is arranged in a line across all the drums at a point of time all the drums are stopped, the control circuit 150 discharges a predetermined number of tokens corresponding to the pattern through the token outlet 114.

The control circuit 150 generates the turn-on control information according to a game state corresponding to a rotation state of the drums 121-1 to 121-3 (for example, a state representing a rotation speed, rotating, or rotation stop of each drum), the operation of the start lever 130, or the operation of the stop buttons 140a to 140c, and transmits the turn-on control information to the display device 1.

The display device 1 is disposed on the front surface side of the drum unit 120 in the opening 111 of the main body casing 110. Each time the display device 1 receives the turn-on control information from the control circuit 150, the display device 1 refers to the turn-on state number included in the turn-on control information, specifies the combination of the light sources to be turned on among the plurality of light sources of the display device 1, and turns on each light source designated by the specified combination, thereby displaying the pattern corresponding to the light source. Thus, the player can see the patterns drawn on the drums 121-1 to 121-3 and the pattern displayed on the display device 1 in an overlapping manner.

The display device 1 will be described in detail below.

Figure 3:
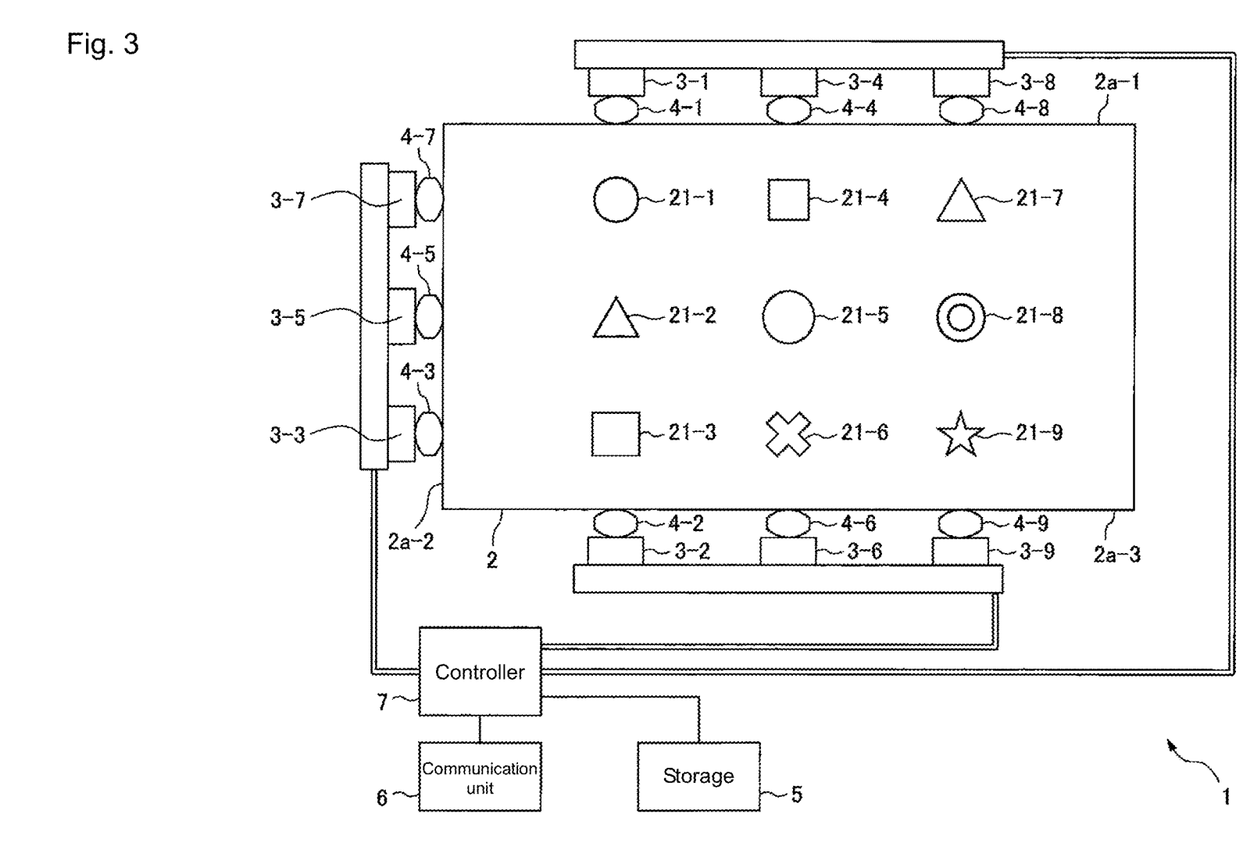
FIG. 3 is a schematic configuration diagram illustrating the display device according to the embodiment of the present invention.

FIG. 3 is a schematic configuration diagram illustrating the display device of the embodiment of the present invention. The display device 1 includes a light guide plate 2, light sources 3-1 to 3-9, collimator lenses 4-1 to 4-9, a storage 5, a communication unit 6, and a controller 7.

The light guide plate 2 is a member formed into a flat plate shape transparent to the light emitted from each of the light sources 3-1 to 3-9. The light guide plate 2 is formed by molding a resin, such as polymethyl methacrylate (PMMA), polycarbonate, and cycloolefin polymer, which is transparent to the visible light. Nine patterns 21-1 to 21-9 that can be displayed by turn-on of the light sources 3-1 to 3-9 are provided in the light guide plate 2.

In the example of FIG. 3, the patterns 21-1 to 21-3 are arranged side by side along the rotation direction of the drum 121-1 (a vertical direction in FIG. 3). Thus, the player can see the displayed pattern overlapping the pattern drawn on the drum 121-1 among the patterns 21-1 to 21-3.

Similarly, the patterns 21-4 to 21-6 are arranged side by side along the rotation direction of the drum 121-2. Thus, the player can see the displayed pattern overlapping the pattern drawn on the drum 121-2 among the patterns 21-4 to 21-6. The patterns 21-7 to 21-9 are arranged side by side along the rotation direction of the drum 121-3. Thus, the player can see the displayed pattern overlapping the pattern drawn on the drum 121-3 among the patterns 21-7 to 21-9.

The light guide plate 2 causes the light emitted from a light source 3-$k$ ($k$=1, 2, . . . , 9) to propagate in the light guide plate 2 while the light source 3-$k$ is turned on, and causes the light to reflect toward the player located within a predetermined angle range based on a normal direction of the outgoing surface on the front surface side using a plurality of prisms (details will be described later) corresponding to the light source 3-$k$, the plurality of prisms being formed on the back surface side so as to form a pattern 21-$k$, which allows the player to visually recognize the pattern 21-$k$ emitting the light.

Details of the light guide plate 2 will be described later.

Each of the plurality of light sources 3-1 to 3-9 includes at least one light emitting element that emits visible light. In the embodiment, each of the light sources 3-1, 3-4, and 3-8 is one of the side surfaces of the light guide plate 2, and is disposed at the substantially same position as the position of the corresponding pattern in a longitudinal direction along the longitudinal direction of an incident surface 2a-1 substantially parallel to the arrangement direction of the drums 121-1 to 121-3. Each light emitting element included in each of the light sources 3-1, 3-4, and 3-8 is disposed such that the light emitting surface of the light emitting element is opposed to the incident surface 2a-1.

Similarly, each of the light sources 3-3, 3-5, and 3-7 is the side surface adjacent to the incident surface 2a-1 among the side surfaces of the light guide plate 2, and is disposed at the substantially same position as the position of the corresponding pattern in the longitudinal direction along the longitudinal direction of an incident surface 2a-2 substantially parallel to the rotation direction of each drum. The light emitting element included in each of the light sources 3-3, 3-5, and 3-7 is disposed such that the light emitting surface of the light emitting element is opposed to the incident surface 2a-2.

Similarly, each of the light sources 3-2, 3-6, and 3-9 is disposed at the substantially same position as the position of the corresponding pattern in the longitudinal direction along the longitudinal direction of an incident surface 2a-3 formed in the side surface on the opposite side to the incident surface 2a-1 among the side surfaces of the light guide plate 2. The light emitting element included in each of the light sources 3-2, 3-6, and 3-9 is disposed such that the light emitting surface of the light emitting element is opposed to the incident surface 2a-3.

Each of the light sources 3-1 to 3-9 is turned on or turned off according to the control signal from the controller 7. While the controller 7 turns on the light source 3-$k$ ($k$=1, 2, . . . , 9), the light emitted from the light source 3-$k$ is collimated by the collimator lens 4-$k$, and enters the light guide plate 2 through a corresponding incident surface among the incident surfaces 2a-1 to 2a-3. The light propagates along a direction substantially orthogonal to the incident surface. Then, after propagating in the light guide plate 2, the light is reflected by the plurality of prisms, which are provided on the diffusion surface on the back surface side of the light guide plate 2 to form the pattern 21-$k$, and is emitted from the outgoing surface on the front surface side.

For example, the light emitting element included in each of the light sources 3-1 to 3-9 is a light emitting diode, an incandescent lamp, or a fluorescent lamp. The luminescent color of each light source may be the same as or differ from each other.

Each of the collimator lenses 4-1 to 4-9 is disposed between the corresponding light source of the light sources 3-1 to 3-9 and the corresponding incident surface of the light guide plate 2, and collimates the light emitted from the corresponding light source. That is, the collimator lens 4-1 is disposed between the light source 3-1 and the incident surface 2a-1, and collimates light emitted from the light emitting element included in the light source 3-1. Similarly, the collimator lenses 4-4 and 4-8 are disposed between the light sources 3-4 and 3-8 and the incident surface 2a-1, respectively, and collimate the light emitted from the light emitting elements included in the light sources 3-4 and 3-8.

The collimator lens 4-3 is disposed between the light source 3-3 and the incident surface 2a-2, and collimates light emitted from the light emitting element included in the light source 3-3. Similarly, the collimator lenses 4-5 and 4-7 are disposed between the light sources 3-5 and 3-7 and the incident surface 2a-2, respectively, and collimate the light emitted from the light emitting elements included in the light sources 3-5 and 3-7.

Further, the collimator lens 4-2 is disposed between the light source 3-2 and the incident surface 2a-3, and collimates the light emitted from the light emitting element included in the light source 3-3. Similarly, the collimator lenses 4-6 and 4-9 are disposed between the light sources 3-6 and 3-9 and the incident surface 2*a*-3, respectively, and collimate the light emitted from the light emitting elements included in the light sources 3-6 and 3-9.

Consequently, the light emitted from each light source is suppressed from irradiating the pattern corresponding to other light sources arranged along with the light source along the same incident surface. For example, the light emitted from the light source 3-1 is suppressed from irradiating the patterns 21-4 and 21-8 corresponding to the light sources 3-4 and 3-8.

The collimator lenses 4-1 to 4-9 may be configured as refractive lenses or diffractive lenses such as a Fresnel zone plate. Each of the collimator lenses 4-1 to 4-9 may be a cylindrical lens that collimates the light emitted from the corresponding light source only in the longitudinal direction of the corresponding incident surface.

For example, the storage 5 includes a volatile or nonvolatile memory circuit. The storage 5 stores a reference table indicating a correspondence relation between the turn-on state number and the combination of the light sources to be turned on.

For example, the communication unit 6 includes a communication interface and a communication circuit in order to communicate with the control circuit 150 of the reel game machine 100. The communication unit 6 is connected to the control circuit 150 through a signal line, receives various pieces of control information controlling the display device 1 from the control circuit 150, and transfers the control information to the controller 7. For example, when receiving the turn-on control information including the turn-on state number, the communication unit 6 transfers the turn-on control information to the controller 7.

For example, the controller 7 includes a processor and a drive circuit of the light sources 3-1 to 3-9. For example, each time the controller 7 receives the turn-on control information from the control circuit 150 of the reel game machine 100 through the communication unit 6, the controller 7 refers to the turn-on state number included in the turn-on control information and the reference table stored in the storage 5 to determine the light source to be turned on among the light sources 3-1 to 3-9. The controller 7 turns on the light source determined to be turned on among the light sources 3-1 to 3-9, and turns off the other light sources. Consequently, the controller 7 can cause the display device 1 to emit and display the combination of the patterns according to the turn-on state number included in the turn-on control information among the patterns 21-1 to 21-9.

Figure 4:
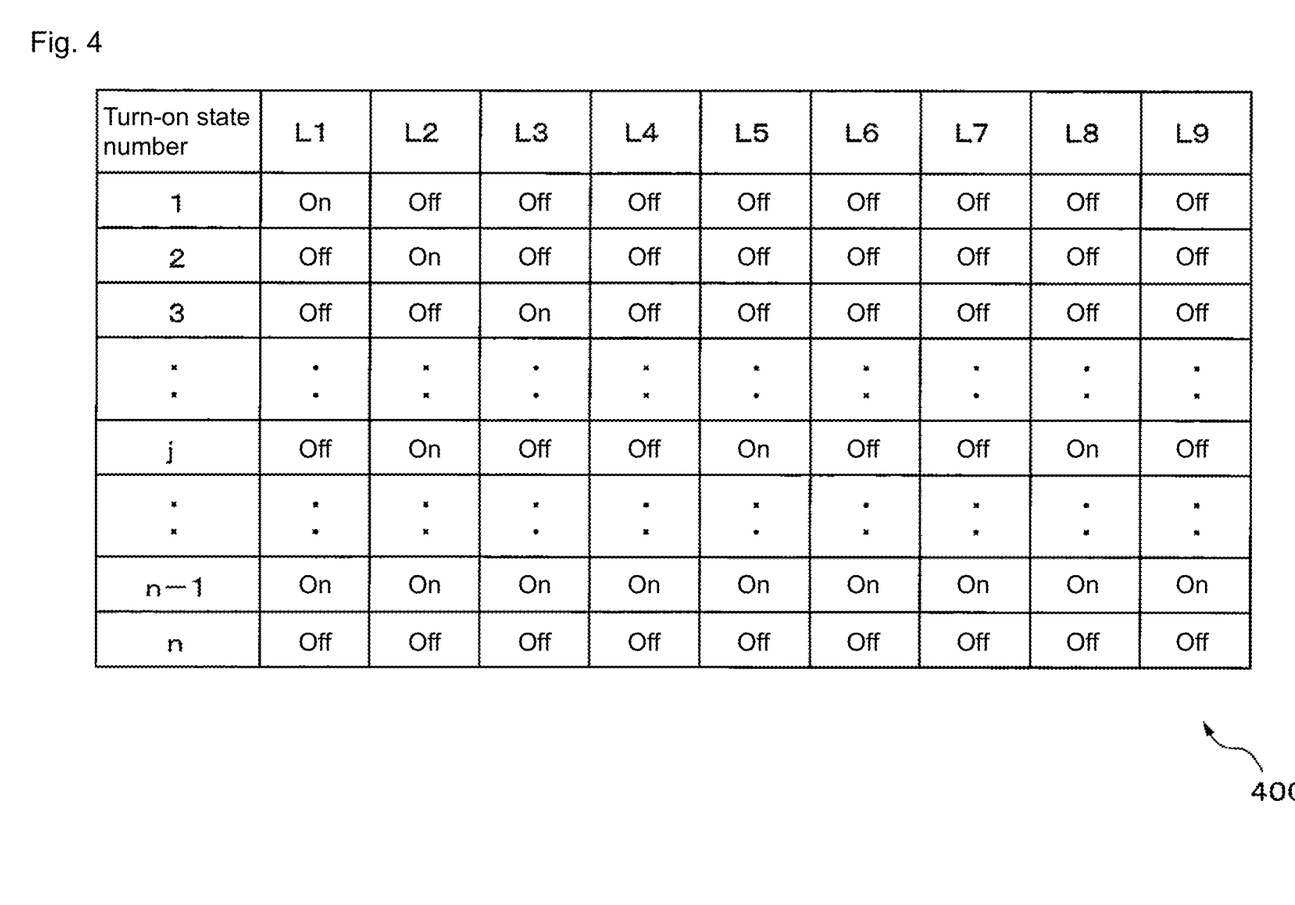
FIG. 4 is a view illustrating an example of a reference table.

FIG. 4 is a view illustrating an example of the reference table. Each field at the left end of a reference table 400 represents the turn-on state number. Each of columns L1 to L9 of the reference table 400 represents turn-on and turn-off of the light sources 3-1 to 3-9. Each row of the reference table 400 represents whether the light sources 3-1 to 3-9 are turned on or turned off for the turn-on state number represented in the leftmost column.

For example, when the turn-on state number is "1", the light source 3-1 is turned on while the other light sources are turned off. Thus, only the pattern 21-1 is displayed among the patterns 21-1 to 21-9. When the turn-on state number is T, the light sources 3-2, 3-5 and 3-8 are turned on and the other light sources are turned off. Thus, the patterns 21-2, 21-5, and 21-8 are displayed. When the turn-on state number is 'n-1', all of the light sources 3-1 to 3-9 are turned on. Thus, all the patterns 21-1 to 21-9 are displayed. When the turn-on state number is 'n', all of the light sources 3-1 to 3-9 are turned off. Thus, none of the patterns 21-1 to 21-9 is displayed.

The details of the light guide plate 2 will be described below.

Figure 5:
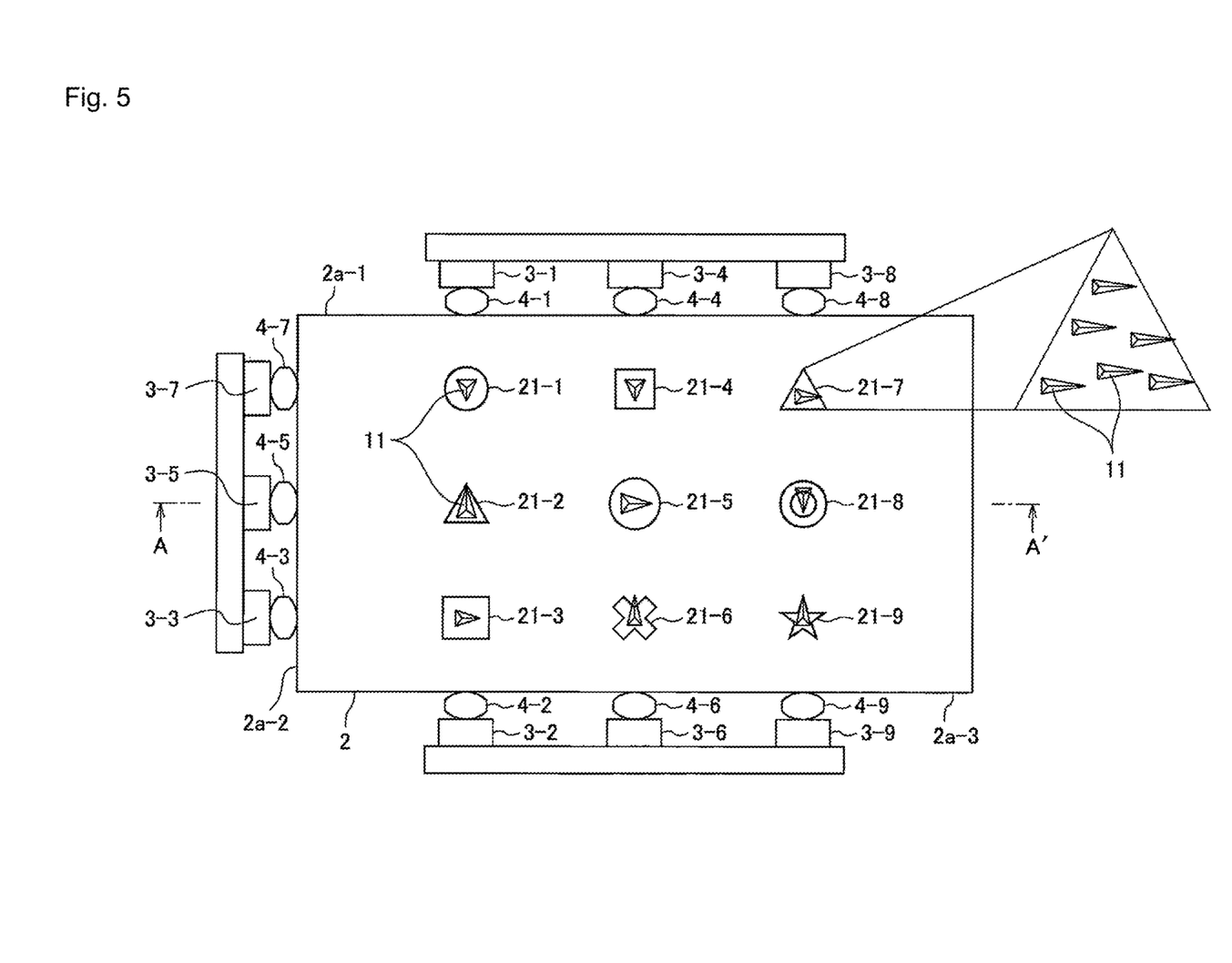
FIG. 5 is a schematic front view of a light guide plate.
Figure 6:
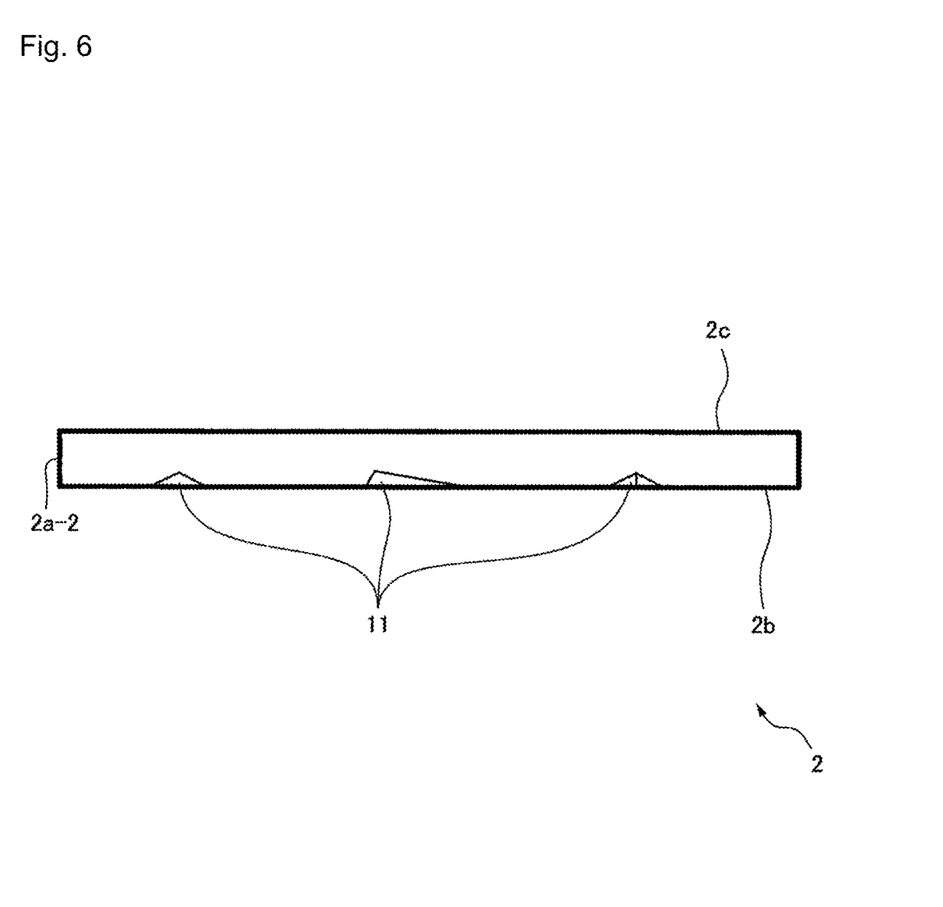
FIG. 6 is a schematic sectional side view illustrating the light guide plate taken along line A-A' in FIG. 5.

FIG. 5 is a schematic front view of the light guide plate 2. FIG. 6 is a schematic sectional side view illustrating the light guide plate 2 taken along line A-A' in FIG. 5. As illustrated in FIGS. 5 and 6, three of the side surfaces of the light guide plate 2 are formed as the incident surfaces 2*a*-1 to 2*a*-3. As described above, the light emitted from each of the light sources 3-1, 3-4, and 3-8 enters the light guide plate 2 from the incident surface 2*a*-1. The light emitted from each of the light sources 3-3, 3-5, and 3-7 enters the light guide plate 2 from the incident surface 2*a*-2. The light emitted from each of the light sources 3-2, 3-6, and 3-9 enters the light guide plate 2 from the incident surface 2*a*-3.

A plurality of prisms 11 that reflect the light, which is emitted from the corresponding light source and propagates in the light guide plate 2, toward the player side are arrayed along each of the patterns 21-1 to 21-9, and each prism is formed on a diffusion surface 2*b* located on the back surface side of the light guide plate 2. That is, the light, from the light source 3-*k*, propagating in the light guide plate 2 is totally reflected by each prism arrayed along the pattern 21-*k* among the plurality of prisms 11, and is emitted from the outgoing surface 2*c* that is located on the front surface side of the light guide plate 2 and opposed to the diffusion surface 2*b*. At that point, each prism arrayed along the pattern 21-*k* reflects the light from the light source 3-*k* toward a direction within a predetermined angle range based on the normal direction of the outgoing surface 2*c* of the light guide plate 2. Thus, the player can observe the pattern 21-*k* that emits the light on the surface of the light guide plate 2 while the light source 3-*k* is turned on. In FIGS. 5 and 6, it is noted that a size of each prism and a thickness of the light guide plate 2 are exaggerated in order to improve visibility of the drawings.

Figure 7:
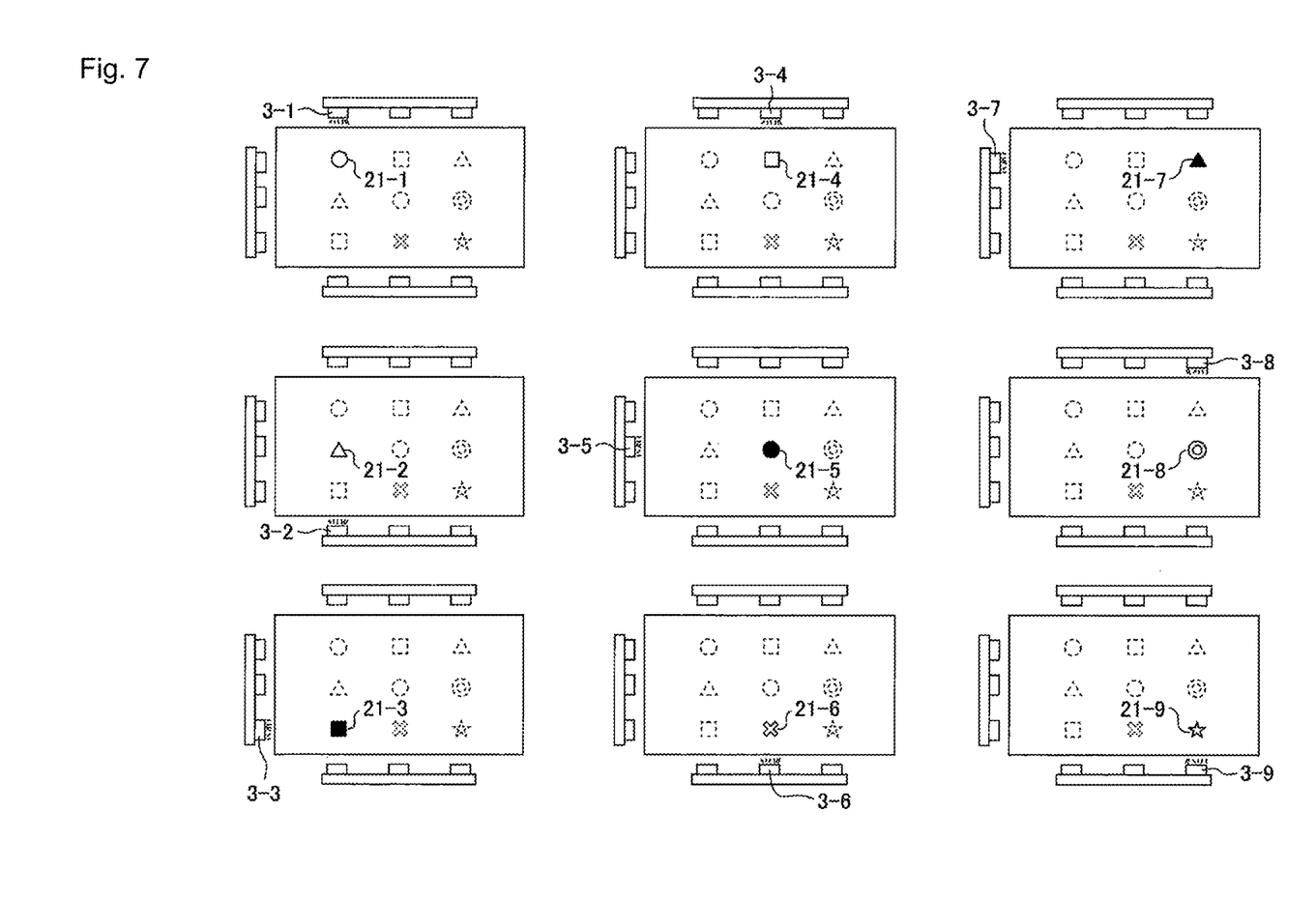
FIG. 7 is a view illustrating an example of a relationship between a light source to be turned on and a pattern to be displayed.

FIG. 7 is a view illustrating an example of a relationship between the light source to be turned on and the displayed pattern. As illustrated in FIG. 7, when the light source 3-*k* (k=1, 2, . . . , 9) is turned on while the other light sources are turned off, the pattern 21-*k* is displayed, and the other patterns becomes invisible.

For example, the prism 11 forming each of the patterns 21-1 to 21-9 is staggered or latticed, or randomly disposed such that arrangement density of the prisms is kept constant within the pattern.

The prisms 11 arrayed in each pattern can have the same configuration only except for the orientation and arrangement for each pattern.

Figure 8A:
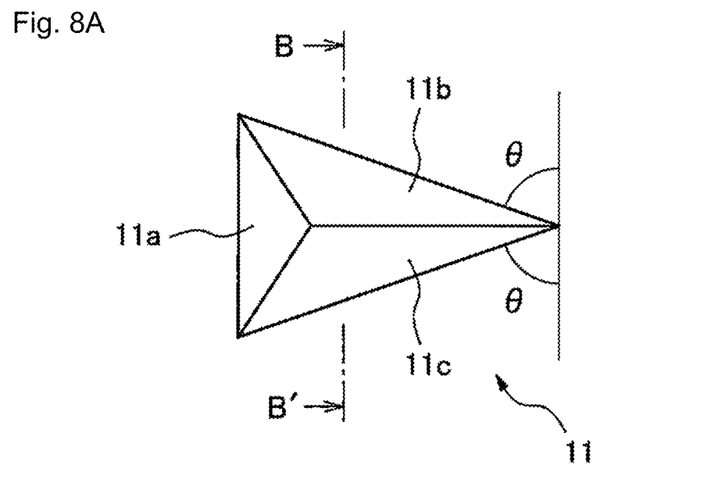
FIG. 8A is a schematic front view of a prism.
Figure 8B:
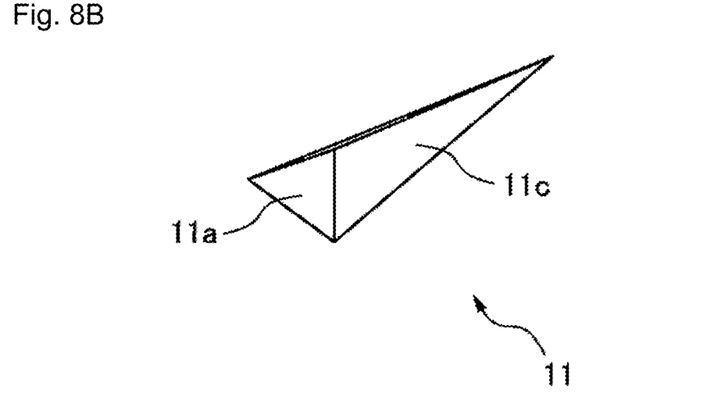
FIG. 8B is a schematic perspective view of the prism.
Figure 8C:
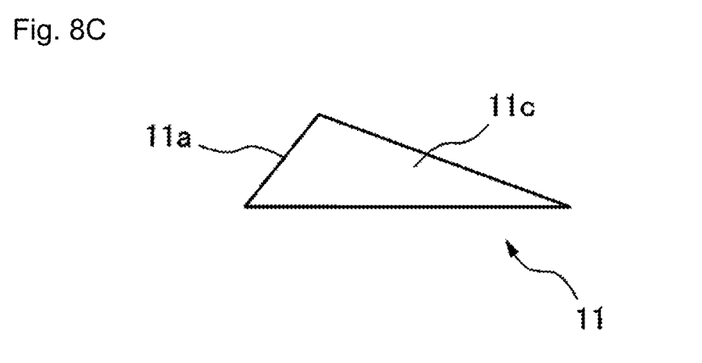
FIG. 8C is a schematic side view of the prism.
Figure 8D:
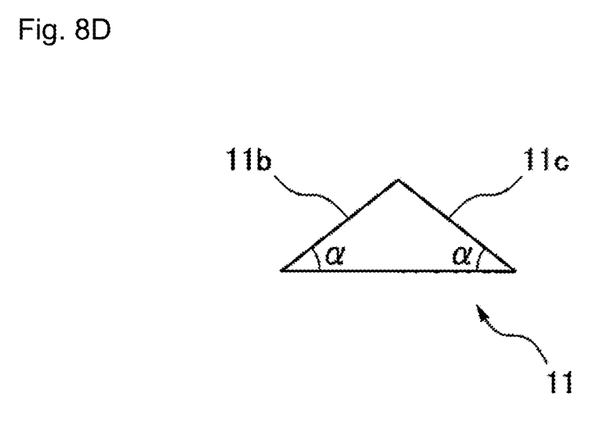
FIG. 8D is a schematic sectional view of the prism taken along line B-B' in FIG. 8A.

FIG. 8A is a schematic front view of the prism 11, and FIG. 8B is a schematic perspective view of the prism 11. FIG. 8C is a schematic side view of the prism 11. FIG. 8D is a schematic sectional view illustrating the prism 11 along line B-B' in FIG. 8A. For example, the prism 11 is formed as a triangular pyramid-shaped groove in which the diffusion surface 2*b* is used as a bottom surface. One of three slopes of the prism 11 is formed as a reflection surface 11*a* that forms a predetermined angle with respect to the diffusion surface 2*b*. The predetermined angle is set such that the light, which is emitted from the corresponding light source (for example, the light source 3-1 for the prism forming the pattern 21-1) and enters the light guide plate 2, is totally reflected and directed toward a direction within a predetermined angle range based on the normal direction of the outgoing surface 2*c*. The other two of the three slopes of the prism 11 are formed as diffusion surfaces 11*b*, 11*c* that reflect the light toward the direction within the predetermined angle range based on the normal direction of the outgoing surface 2c such that the player cannot visually recognize the light, the light being emitted from the light source except for the corresponding light source (for example, for the prism forming the pattern 21-1, the light emitted from the light sources 3-2 and 3-7 is incident from the incident surface except for the incident surface 2a-1 and reaches the pattern 21-1).

Referring to FIG. 5 again, each prism 11 forming the pattern 21-k is disposed such that the reflection surface 11a faces the light source 3-k, namely, the incident surface on which the light from the light source 3-k is incident and the reflection surface 11a are disposed so as to be substantially parallel to each other in a plane parallel to the diffusion surface 2b. For example, each prism forming the pattern 21-1 is disposed such that the reflection surface 11a faces the light source 3-1 (that is, the reflection surface 11a is substantially parallel to the incident surface 2a-1).

Consequently, the light, which is emitted from the light source 3-k, enters the light guide plate 2, and is directed to any one of the prisms forming the pattern 21-k, is reflected by the reflection surface 11a of the prism, and is emitted from the outgoing surface 2c of the light guide plate 2 toward the player located on the front surface side of the light guide plate 2. On the other hand, the light, which is emitted from the light source except for the light source 3-k, enters the light guide plate 2, and is directed to any one of the prisms forming the pattern 21-k, is reflected toward the direction out of the predetermined angle range based on the normal direction of the outgoing surface 2c of the light guide plate 2 by the diffusion surface 11b or 11c of the prism so that the player does not visually recognize the light.

At this point, the direction in which the light emitted from the light source except for the light source 3-k and incident on the light guide plate 2 is reflected by the diffusion surface 11b or 11c of the prism forming the pattern corresponding to the light source 3-k is determined by a combination of an angle θ (hereinafter, referred to as a rotation angle for convenience) formed between the direction (for example, for the prism forming the pattern 21-1, the direction orthogonal to the propagation direction of light from the light source 3-1 and parallel to the incident surface 2a-1) orthogonal to the propagation direction of light from the light source 3-k and the diffusion surface 11b or 11c of the prism, and an angle α (hereinafter, referred to as an inclination angle for convenience) formed between the diffusion surface 2b of the light guide plate 2 and the diffusion surface 11b or 11c of the prism. An angle formed between the reflected light and the normal direction of the outgoing surface 2c when the reflected light is emitted from the light guide plate 2 is affected by a refractive index of the material for the light guide plate 2.

For example, it is assumed that the predetermined angle range based on the direction in which the player is located, namely, the normal direction of the outgoing surface 2c of the light guide plate 2 is within 30° from the normal direction of the outgoing surface 2c of the light guide plate 2. In this case, when the light guide plate 2 is made of polycarbonate (refractive index of 1.59) or PMMA (refractive index of 1.49), in order that the light emitted from the light source except for the corresponding light source and reflected by the prism 11 is directed to the direction out of the predetermined angle range so as not to be directed to the player, preferably each prism 11 is formed such that the rotation angle θ is within the range of 25° to 65° while the inclination angle α is within the range of 25° to 55°.

It is assumed that the predetermined angle range based on the normal direction of the outgoing surface 2c of the light guide plate 2 is within 45° from the normal direction of the outgoing surface 2c of the light guide plate 2. In this case, when the light guide plate 2 is made of polycarbonate or PMMA, in order that the light emitted from the light source except for the corresponding light source and reflected by the prism 11 is directed to the direction out of the predetermined angle range, preferably each prism 11 is formed such that the rotation angle θ is within the range of 35° to 55° while the inclination angle α is within the range of 25° to 55°.

It is assumed that the predetermined angle range based on the normal direction of the outgoing surface 2c of the light guide plate 2 is within 60° from the normal direction of the outgoing surface 2c of the light guide plate 2. In this case, when the light guide plate 2 is made of polycarbonate or PMMA, in order that the light emitted from the light source except for the corresponding light source and reflected by the prism 11 is directed to the direction out of the predetermined angle range, preferably each prism 11 is formed such that the rotation angle θ is within the range of 40° to 50° while the inclination angle α is within the range of 25° to 55°.

The rotation angle and the inclination angle of the diffusion surface of each prism 11 in any pattern may similarly be set.

As described above, in the display device, the plurality of patterns formed by the array of the prisms are provided on the light guide plate, and the patterns are displayed by causing the light sources corresponding to the respective patterns to emit the light. In the display device, the combination of light sources to be turned on is specified by referring to the reference table in which the combination of the light sources to be turned on, namely, the combination of the display patterns and the turn-on state number are associated with each other, the combination of light sources to be turned on corresponding to the turn-on state number included in the received turn-on control information. Thus, only the turn-on state number is designated when the display pattern is dynamically switched, so that the display device can simplify the switching of the display pattern. As a result, the control load relating to the switching of the display pattern is reduced in the control circuit of the game machine in which the display device is incorporated.

According to a modification, the collimator lens may be omitted. In the modification, each light source includes one light emitting element. The light emitted from each light source enters the light guide plate 2 through the incident surface opposed to the light source. The incident light spreads in the direction parallel to the incident surface as it propagates in the light guide plate 2.

Thus, in the modification, for each pattern, preferably each prism 11 forming the pattern is formed such that the reflection surface 11a faces the corresponding light source, namely, such that the reflection surface 11a is located along an arc centered on the corresponding light source on a plane parallel to the diffusion surface 2b of the light guide plate 2. Consequently, each prism 11 can reflect the light emitted from the corresponding light source and incident on the light guide plate 2 toward the player located within the predetermined angle range based on the normal direction of the outgoing surface 2c on the front surface side of the light guide plate 2. On the other hand, the light emitted from the light source except for the corresponding light source and incident on the light guide plate 2 is reflected by the diffusion surface 11b or 11c of each prism 11, and is directed to the direction different from the direction in which the player is located, namely, the direction out of the predetermined angle range based on the normal direction of the outgoing surface 2c.

According to another modification, the reference table stored in the storage 5 may represent correspondence relation among the turn-on state number, at least two combinations of the light sources to be turned on, and the order in which each of the at least two combinations is applied for at least one of a plurality of turn-on state numbers. In this case, the controller 7 may refer to the reference table, specify the at least two combinations of the light sources to be turned on and application order of each of the at least two combinations, the at least two combinations of the light sources to be turned on corresponding to the notified turn-on state number, and switch the combination of the specified light sources to be turned on at each constant cycle according to the specified application order. Thus, according to the modification, the display device can dynamically switch the combination of the display patterns only by being notified of one turn-on state number, so that the combination of display patterns can more simply be switched.

In the modification, the turn-on control information may include information designating a cycle in which the combination of light sources to be turned on is switched. The controller 7 may switch the combination of light sources to be turned on according to the application order at each cycle designated by the information. Consequently, the display device can simplify the switching of the combination of the display patterns and the control of the switching cycle.

According to still another modification, the number of patterns provided on the light guide plate is not limited to nine, but may be at least two. Each of the plurality of patterns provided on the light guide plate may partially overlap each other. The light guide plate may be formed so as to be curved in an arc shape along the outer circumference of each drum of the drum unit.

According to yet another modification, the game machine including the display device according to the above embodiment or modifications may include another display device such as a liquid crystal display instead of the drum unit. The game machine including the display device of the above embodiment or modifications may be a ball game machine.

Thus, those skilled in the art can make various modifications within the scope of the present invention according to the embodiment to be implemented.

DESCRIPTION OF SYMBOLS 1 display device
2 light guide plate
2a-1 to 2a-3 incident surface
2b diffusion surface
2c outgoing surface
3-1 to 3-9 light source
11 prism
11a reflection surface
11b, 11c diffusion surface
21-1 to 21-9 pattern
4, 4-1 to 4-9 collimator lens
5 storage
6 communication unit
7 controller
100 reel game machine
110 main body casing
120 drum unit
130 start lever
140a to 140c stop button
150 control circuit
111 opening
112 frame
113 token slot
114 token outlet
115 token tray

The invention claimed is:

1. A game machine comprising:
a game machine main body;
a display device provided on a surface of the game machine main body on a side opposed to a player; and
a control circuit configured to generate turn-on control information including one of a plurality of turn-on state numbers according to a state of a game, and transmit the turn-on control information to the display device;
wherein the display device includes:
a light guide plate made of a transparent material, capable of displaying a plurality of patterns, and including an incident surface;
a plurality of light sources disposed opposite to the incident surface and corresponding to the plurality of patterns;
a storage configured to store a reference table that represents a relationship between a turn-on state number and a combination of light sources to be turned on among the plurality of light sources for each of a plurality of the turn-on state numbers;
a communication unit configured to receive the turn-on control information; and
a controller configured to specify the combination of light sources to be turned on among the plurality of light sources by referring to the reference table, the combination corresponding to the turn-on state number included in the turn-on control information, and control turn-on and turn-off of the plurality of light sources according to the combination of the light sources,
wherein the light guide plate includes a plurality of prisms arrayed on one of surfaces of the light guide plate along the plurality of patterns, the plurality of prisms reflecting light toward the other surface of the light guide plate, the light being emitted from a light source corresponding to the pattern among the plurality of light sources and being incident on the light guide plate from the incident surface.

* * * * *